(12) United States Patent
Couture

(10) Patent No.: US 9,851,177 B2
(45) Date of Patent: Dec. 26, 2017

(54) COATING FOR LIGHT SECURITY

(71) Applicant: BAE Systems Oasys LLC, Nashua, NH (US)

(72) Inventor: Michael Couture, Litchfield, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 416 days.

(21) Appl. No.: 14/261,831

(22) Filed: Apr. 25, 2014

(65) Prior Publication Data
US 2015/0377587 A1    Dec. 31, 2015

Related U.S. Application Data

(60) Provisional application No. 61/886,698, filed on Oct. 4, 2013.

(51) Int. Cl.
| | |
|---|---|
| *H04N 5/33* | (2006.01) |
| *H04N 5/30* | (2006.01) |
| *F41G 1/32* | (2006.01) |
| *G02B 27/14* | (2006.01) |
| *G02B 27/01* | (2006.01) |

(52) U.S. Cl.
CPC ............ *F41G 1/32* (2013.01); *G02B 27/0172* (2013.01); *G02B 27/0189* (2013.01); *G02B 27/144* (2013.01); *G02B 2027/0138* (2013.01)

(58) Field of Classification Search
None
See application file for complete search history.

(56) References Cited

U.S. PATENT DOCUMENTS

| | | | | |
|---|---|---|---|---|
| 5,264,877 A | * | 11/1993 | Hussey | G02C 7/101 351/158 |
| 6,385,894 B1 | * | 5/2002 | Podvin | F41C 27/00 42/117 |
| 6,809,871 B2 | * | 10/2004 | Heller | G02B 27/1073 219/121.6 |
| 8,867,131 B1 | * | 10/2014 | Amirparviz | G02B 5/04 359/485.03 |
| 9,194,995 B2 | * | 11/2015 | Gupta | G02B 5/02 |
| 9,239,415 B2 | * | 1/2016 | Miao | G02B 5/30 |
| 2002/0040634 A1 | * | 4/2002 | Pinkus | F41G 7/226 89/1.11 |
| 2003/0026001 A1 | * | 2/2003 | Heller | G02B 27/1073 359/629 |
| 2006/0072005 A1 | * | 4/2006 | Thomas-Wayne | H04N 13/0242 348/50 |

(Continued)

*Primary Examiner* — Mohammad J Rahman
(74) *Attorney, Agent, or Firm* — Sand & Sebolt, LPA

(57) ABSTRACT

A night vision system includes an eyepiece and a video camera to capture a video image that can be remote to the eyepiece. The eyepiece includes an optical device with a front side and a back side. A splitting surface within the optical device reflects some of a video image toward an eye of a user of the eyepiece, and the splitting surface further allows some light of an optical image received from in front of the eyepiece to past through the eyepiece to the eye of the user. The layer of switchable coating on the eyepiece can be switched between a transparent mode and an opaque mode by the user. When in an opaque mode no light can leave the front side of the optical device and only the video image can be seen through the eyepiece.

21 Claims, 4 Drawing Sheets

(56) References Cited

U.S. PATENT DOCUMENTS

| | | | | |
|---|---|---|---|---|
| 2011/0073773 | A1* | 3/2011 | Labrot | B32B 17/10 250/461.1 |
| 2012/0060673 | A1* | 3/2012 | Burton | F41H 7/02 89/1.8 |
| 2012/0218301 | A1* | 8/2012 | Miller | G02B 27/017 345/633 |
| 2012/0242678 | A1* | 9/2012 | Border | G02B 27/0093 345/589 |
| 2012/0242697 | A1* | 9/2012 | Border | G02B 27/0093 345/633 |
| 2012/0249797 | A1* | 10/2012 | Haddick | G06F 1/163 348/158 |
| 2013/0127980 | A1* | 5/2013 | Haddick | G06F 3/013 348/14.08 |
| 2013/0147685 | A1* | 6/2013 | Gupta | G02B 5/02 345/8 |
| 2013/0235191 | A1* | 9/2013 | Miao | G02B 5/30 348/143 |
| 2013/0278631 | A1* | 10/2013 | Border | G02B 27/017 345/633 |
| 2013/0314303 | A1* | 11/2013 | Osterhout | G06F 3/005 345/8 |
| 2014/0063054 | A1* | 3/2014 | Osterhout | G06F 3/005 345/633 |
| 2014/0063055 | A1* | 3/2014 | Osterhout | G06F 3/005 345/633 |
| 2014/0104692 | A1* | 4/2014 | Bickerstaff | G02B 27/017 359/630 |

* cited by examiner

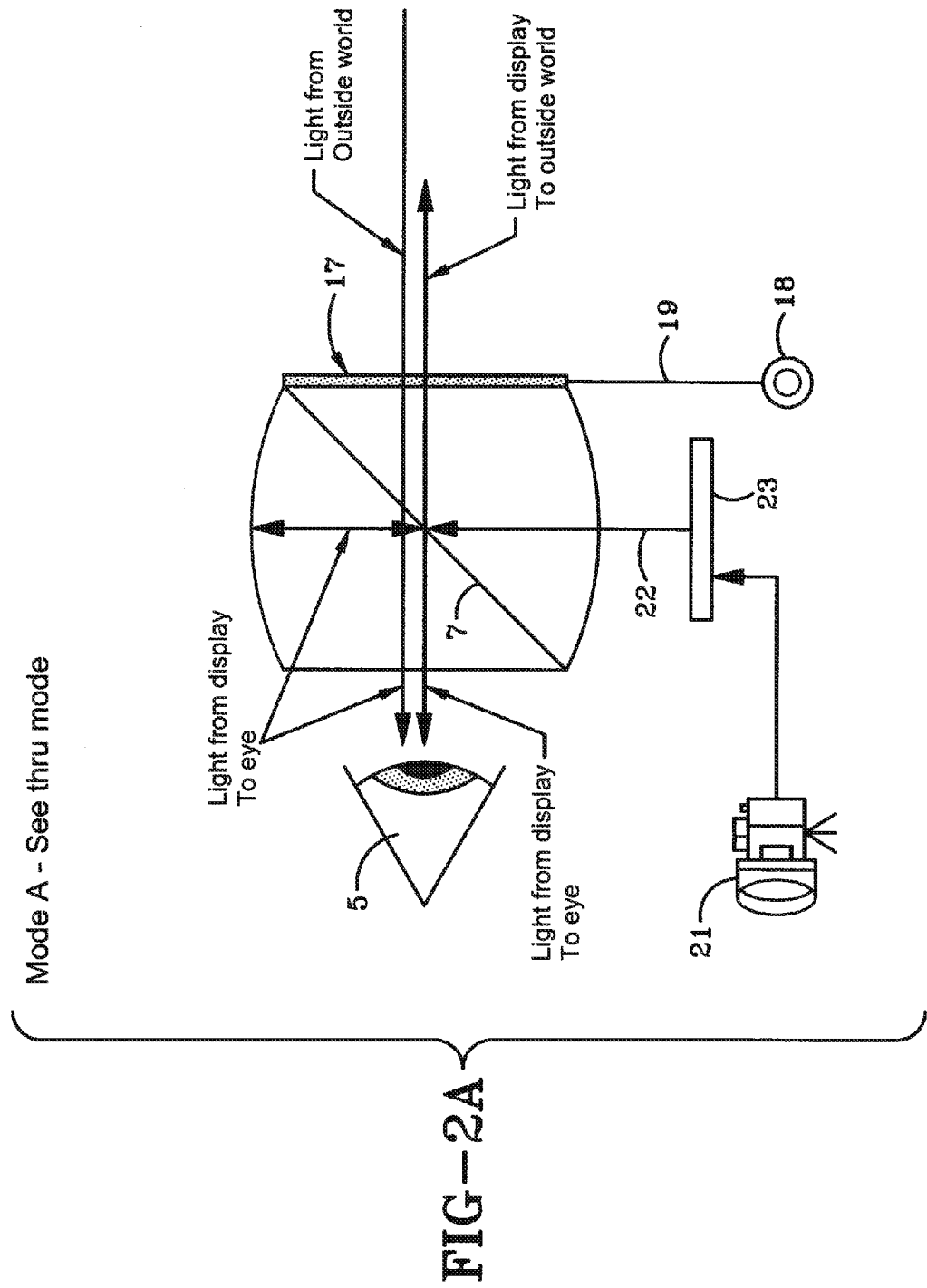

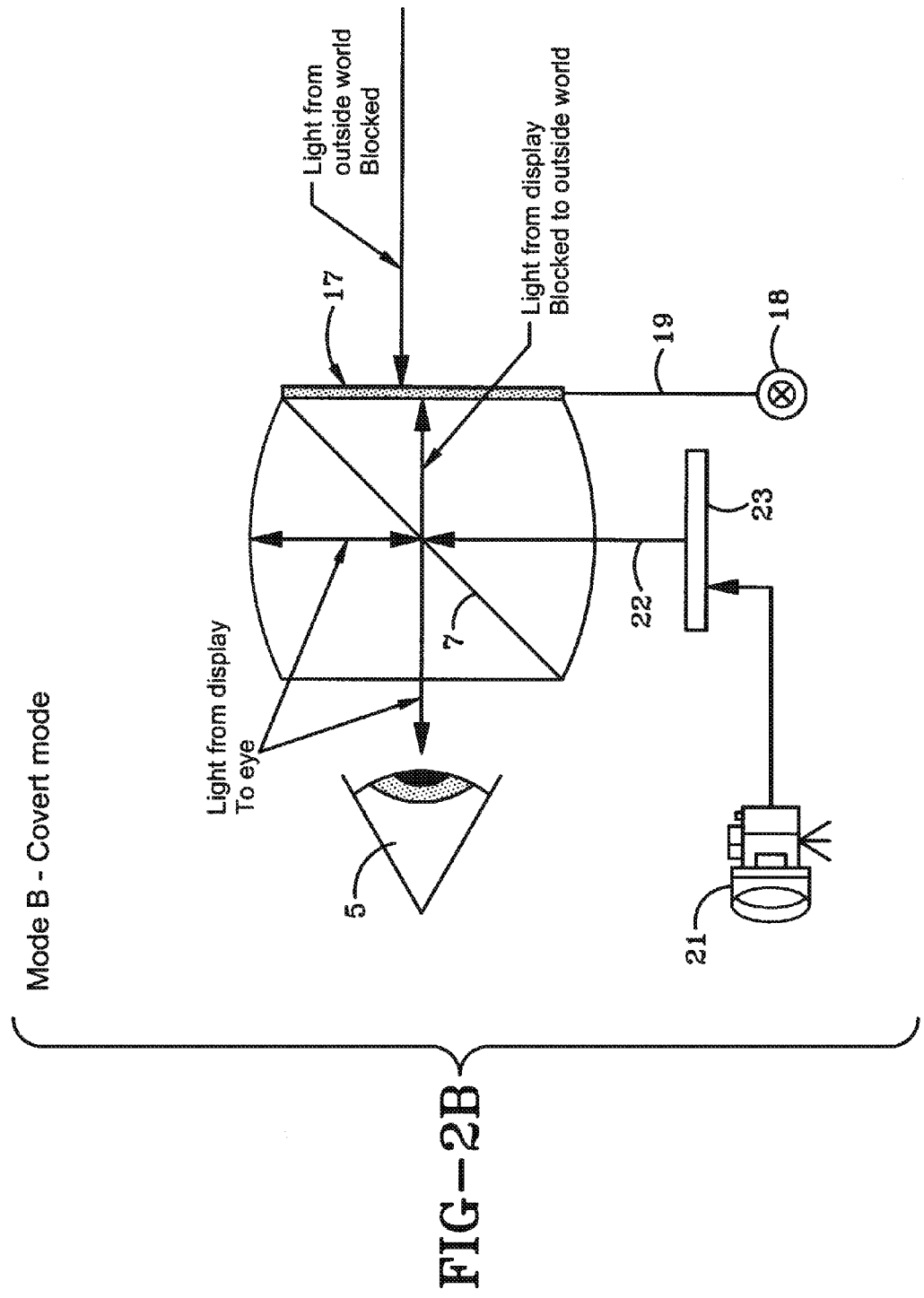

COATING FOR LIGHT SECURITY

CROSS REFERENCE TO RELATED APPLICATION

This application claims priority from U.S. Provisional Application Ser. No. 61/886,698, filed Oct. 4, 2013; the disclosure of which is incorporated herein by reference.

BACKGROUND OF THE INVENTION

1. Field of Invention

The current invention relates generally to apparatus, systems and methods for night time vision. More particularly, the apparatus, systems and methods relate to using optical vision together with another type vision such as infra-red (IR) vision. Specifically, the apparatus, systems and methods provide for preventing light from exiting optics of a night time vision system.

2. Description of Related Art

A night vision device (NVD) is a device comprising an image intensifier tube in a rigid casing, commonly used by military forces. Lately, night vision technology has become more widely available for civilian use. For example, enhanced vision systems (EVS) have become available for aircraft to help pilots with situational awareness and avoid accidents. These systems are included in the latest avionics packages from manufacturers such as Cirrus and Cessna.

A specific type of NVD, the night vision goggle (NVG) is a night vision device with dual eyepieces. The device can utilize either one intensifier tube with the same image sent to both eyes, or a separate image intensifier tube for each eye. Night vision goggles combined with magnification lenses constitutes night vision binoculars. Other types include monocular night vision devices with only one eyepiece which may be mounted to firearms as night sights. NVG and EVS technologies are becoming more popular products for helicopter operations to improve safety. The Nation Transportation and Safety Board (NTSB) is considering EVS as recommended equipment for safety features.

Night glasses are single or binocular with a large diameter objective. Large lenses can gather and concentrate light, thus intensifying light with purely optical means and enabling the user to see better in the dark than with the naked eye alone. Often night glasses also have a fairly large exit pupil of 7 mm or more to let all gathered light into the user's eye. However, many people cannot take advantage of this because of the limited dilation of the human pupil. To overcome this, soldiers were sometimes issued atropine eye drops to dilate pupils. Before the introduction of image intensifiers, night glasses were the only method of night vision, and thus were widely utilized, especially at sea. Second World War era night glasses usually had a lens diameter of 56 mm or more with magnification of seven or eight. Major drawbacks of night glasses are their large size and weight.

Night vision systems can also be installed in vehicles. An automotive night vision system is used to improve a vehicle driver's perception and seeing distance in darkness or poor weather. Such systems typically use infrared cameras, sometimes combined with active illumination techniques, to collect information that is then displayed to the driver. Such systems are currently offered as optional equipment on certain premium vehicles.

What is needed is a better night vision system.

SUMMARY

One aspect of an embodiment of the invention may include a system for better night vision. A night vision system includes an eyepiece and a video camera to capture a video image that can be remote to the eyepiece. The eyepiece includes an optical device with a front side and a back side. A splitting surface within the optical device reflects some of a video image toward an eye of a user of the eyepiece, and the splitting surface further allows some light of an optical image received from in front of the eyepiece to past through the eyepiece to the eye of the user. The layer of switchable coating on the eyepiece can be switched between a transparent mode and an opaque mode by the user. When in an opaque mode, no light can leave the front side of the optical device and only the video image can be seen through the eyepiece In one aspect, another embodiment may provide for a night vision system that includes an eyepiece with optics to view optical images in front of the eyepiece. A thermal camera enhances low light images and projects them into the eyepiece simultaneously with the optical images. A switchable layer is switchable between a transparent mode allowing light to enter and exit the eyepiece and an opaque mode that only allows the video images to enter the eyepiece and prevents light from exiting a front side of the eyepiece.

Another aspect of the preferred embodiment may be configured as a method for better night vision. The method allows optical images in front of an eyepiece to enter the eyepiece. Simultaneously, video images taken with a camera are projected into the eyepiece. A switchable material is later switched from a transparent mode that allows the optical images to enter the eyepiece to an opaque mode that prevents light from exiting at least a front end of the eyepiece.

BRIEF DESCRIPTION OF SEVERAL VIEWS OF THE DRAWINGS

One or more preferred embodiments that illustrate the best mode(s) are set forth in the drawings and in the following description. The appended claims particularly and distinctly point out and set forth the invention.

The accompanying drawings, which are incorporated in and constitute a part of the specification, illustrate various example methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

FIG. 2A is another illustration of an example night vision system with a switchable coating in transparent mode.

FIG. 2B is another illustration of an example night vision system with a switchable coating in an opaque mode.

Similar numbers refer to similar parts throughout the drawings.

DETAILED DESCRIPTION

An example preferred embodiment will be described with reference to a night vision system that can be worn or used by a soldier in a battlefield. However, it is to be understood that this example system can be used in other environments such as in aviation environments, in vehicle environments, in other civilian environments and in other uses that require enhanced vision.

When operating in covert scenarios a soldier may need to block light leakage from an electronic imaging system. Currently a common solution is to utilize a physical/mechanical opaque cover on the outer face of the imaging system to block the light leak path. Some potential drawbacks exist when utilizing a mechanical cover. The cover may be dropped or lost, or additionally, if the cover snaps into place it may produce undesirable noise that has the potential to compromise auditory security.

Figure 1:
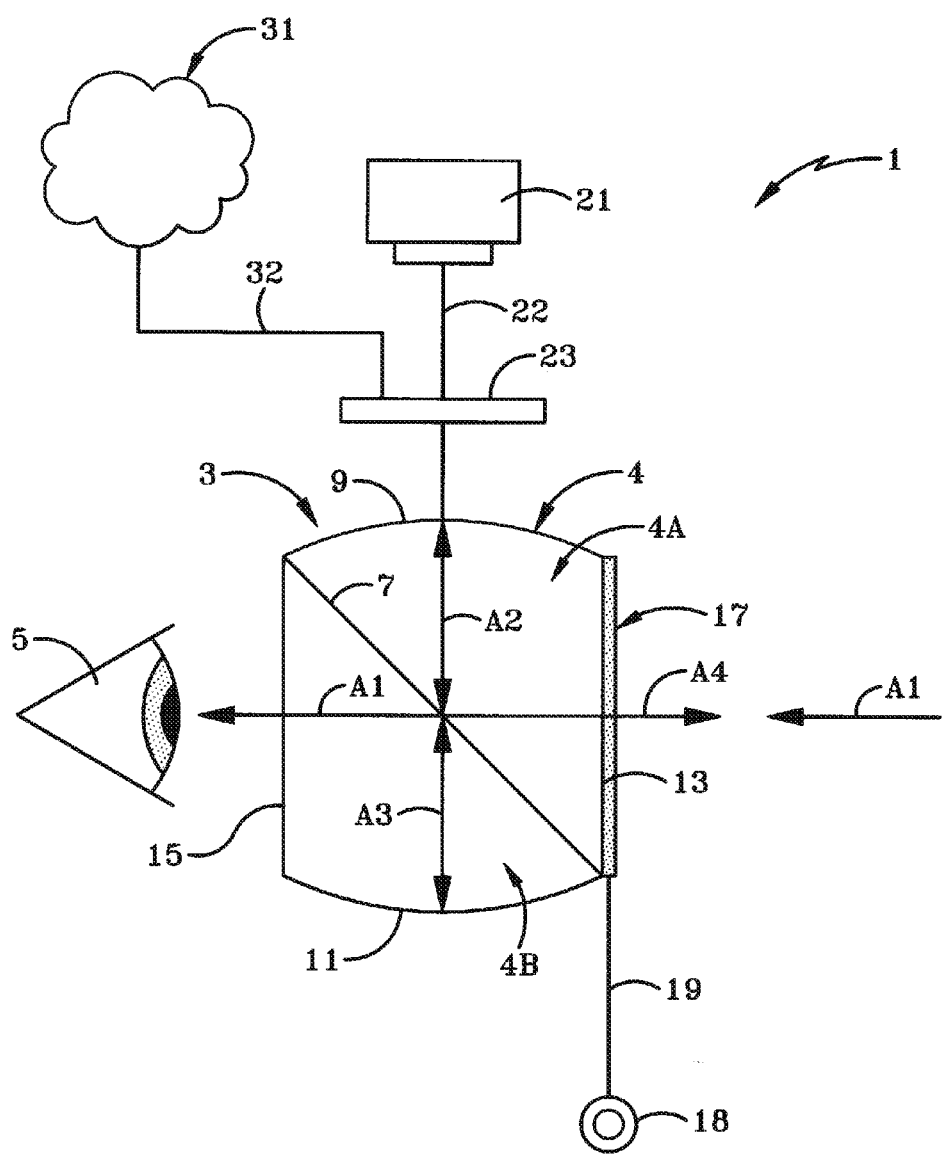
FIG. 1 illustrates a preferred embodiment of an example night vision system.

FIG. 1 illustrates an example preferred embodiment of a night vision system 1 that solves the problems of using a mechanical cover by replacing it with a switchable coating on an eyepiece. The system 1 includes an eyepiece 3 that has a top end 9, a bottom end 11, a front end 13 and a back end 15. A user of the system 1 locates his eye 5 near the back end 15 of the device when using the night vision system 1. The eyepiece 3 further includes one or more optical device(s) 4 that may be a len(s) or other optical devices. In the preferred embodiment the optical device 4 is formed with two prisms 4A-B with a splitting surface 7 (discussed below) between them. Optical device 4 is formed with plastic with the splitting surface 7 inside the plastic.

In the preferred embodiment, the eyepiece 3 is attached to a mounting device that is, for example, attached to a soldier's helmet. In the preferred embodiment, the eyepiece 3 includes the splitting surface 7 so that it bisects optical device 4 at an angle as illustrated. In the preferred embodiment, the splitting surface 7 is placed in the prisms 4A-B of the optical device at a 45 degree angle so that a remote image (as described further below) is reflected to the eye 5. For example, the splitting surface 7 is made out of a very thin layer of evaporated metal coating. The metallic coating may allow between 45 percent and 55 percent of light to pass through the metallic coating. Those of ordinary skill in the art will appreciate that other types of splitting surfaces can be used. For example, the night vision system may comprise a curved surface on the optical device 4 between the switchable material 17 and the eye 5 of the user. The night vision system may also comprise a lens with a convex lens surface between the switchable material 17 and the eye 5 of the user.

One novel feature over prior art optical systems is that a switchable coating 17 is placed on the front end 13 of the eyepiece 3 that is switchable between a transparent mode and an opaque mode. In the transparent mode, the switchable coating 17 essentially allows all light to pass through the switchable coating 17. In the opaque mode, the switchable coating 17 prevents light from exiting the eyepiece 3 in addition to entering the eyepiece 3. In the preferred embodiment, the switchable coating 17 is electrically switchable and is an electro-chromic coating. However, it can be other materials and can be switchable in different ways.

A button 18 can be connected to the switchable coating 17 through either a wireless or wired communication link 19. This button 18 provides an easy way for one to switch between opaque mode and the transparent mode.

The system 1 further includes a camera 21 that can be a remote camera that is remote from the eyepiece 3. Preferably, this camera 21 is an infra-red (IR) camera or another type of thermal camera that can enhance low light images. Additionally, this camera 21 is, in the preferred embodiment, a video camera that captures streaming real-time video images. In one example embodiment, this camera 21 is attached to a soldier's gun. When attached to a soldier's gun it allows him to safely look around corners. For example, the soldier can remain behind a corner and only using his hands, point his gun and the attached camera around the corner to see what is behind the corner before subjecting his whole body around the corner. The camera 21 can be attached in other locations such as on a vehicle, be placed on hill overlooking a battlefield to allow a soldier to see an overall battlefield in addition to his local location or the remote camera 21 can be attached to other objects or located in other places.

The system 1 further includes an Organic LED (OLED) panel 23. This panel 23 receives video data from the camera 21 over a communications link 22 and displays this video onto the eyepiece 3 as described below. The night vision system 1 can further include, in some configurations, a communications link 32 between the OLED 23 and a data network 31.

Having described the components of the night vision system 1, its use and operation will now be described. As illustrated in FIG. 1, a user of the night vision system 1 would position the eyepiece near their eye 5. For example, the eyepiece 3 may be mounted to a mounting device on a soldier's helmet allowing him correctly position the eyepiece 3. Only a single eyepiece is shown in FIG. 1, however, in other configurations two eyepieces can be used so that both eyes can be used similar to binocular vision.

When the night vision system 1 is turned on, the soldier receives an optical image that passes through the optical device 4 (e.g., lens) of what is immediately in front of him. The image passes through the optical device 4 in the direction of arrows A1. Simultaneously, a streaming real-time video is captured from the camera 21 and digitized and transferred over wire 22 to the OLED panel 23. The OLED panel 23 then decodes the video and projects it in the direction of arrow A2. Notice that the top 9 and bottom 11 ends of the optical device 4 are curved to better focus the video from the OLED panel 23 into the optical device 4. Upon entering the optical device 4, the image then passes through the splitting surface 7 until it is reflected from the bottom surface 11 (arrow A3) and then reflects off of the splitting surface 7 at the top end of arrow A3 and is projected towards the eye 5 in the direction of arrow A1. Both the video from the camera 21 and the images in front of the eyepiece 3 are now seen simultaneously by the soldier. FIG. 2A is another alternative illustration of an example night vision system with a switchable coating in transparent mode. In most cases, these are the same image because the camera 21 is pointed in the same direction as the eyepiece 3 but in some cases they can be different images that are superimposed together when the camera 21 is not is pointed in the same direction as the eyepiece 3. In those cases, the soldier can focus his attention on the image of interest.

In other configurations, rather than sending camera images into the OLED panel other data may be sent to it from the network 31 over the communications link 32, which may include a wireless link. This data may be a Global Positioning System (GPS) location of the soldier, battlefield instructions and other secret data.

Notice that the splitting surface 7 allows some of the video from the camera 21 to be reflected out of the splitting surface 7 in the direction of arrow A4. Similarly, some of the images in front of the eyepiece 3 are reflected off the splitting surface 7 and also are directed in the upward direction of arrow A2. In the preferred embodiment, about 50% of both the video image and optical image are passed through the splitting surface 7 and about 50% of them are reflected. Arrow A2 also indicates that some of the video images may reflect off the splitting surface of the eyepiece 3 and are reflected out of the eyepiece 3 in the direction of arrow A4. This light is unwanted because it can be seen by an enemy to provide them the location of the soldier using the night vision system 1. To prevent this light from leaking out, the soldier merely presses the button 18 to energize the switchable coating 17 causing it to go from transparent to opaque to block any light from exiting the front end 13 of the eyepiece 3. FIG. 2B is another example illustration of an example night vision system with a switchable coating in an opaque mode. During daylight hours, the button 18 is again pressed to turn off the switchable coating 17 causing it to go from opaque back to transparent.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 3:
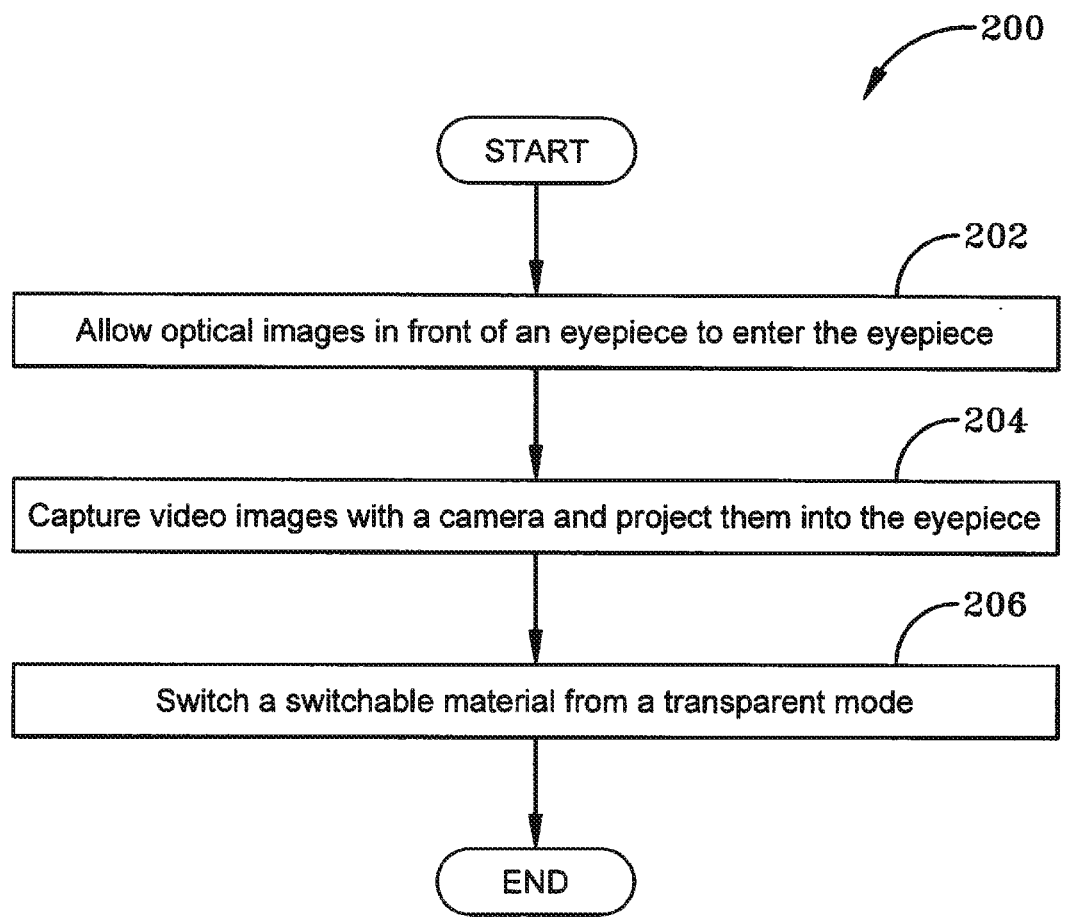
FIG. 3 illustrates an embodiment of a method for enhanced night vision.

FIG. 3 illustrates a method 200 of better night vision. The method 200 allows, at 202, optical images in front of an eyepiece to enter the eyepiece. Simultaneously, video images taken with a camera are projected, at 203 into the eyepiece as discussed above. A switchable material is later switched, at 206, from a transparent mode that allows the optical images to enter the eyepiece to an opaque mode that prevents light from exiting at least a front end of the eyepiece. The switchable material can be, as discussed above, an electro-chromic material.

In the foregoing description, certain terms have been used for brevity, clearness, and understanding. No unnecessary limitations are to be implied therefrom beyond the requirement of the prior art because such terms are used for descriptive purposes and are intended to be broadly construed. Therefore, the invention is not limited to the specific details, the representative embodiments, and illustrative examples shown and described. Thus, this application is intended to embrace alterations, modifications, and variations that fall within the scope of the appended claims.

Moreover, the description and illustration of the invention is an example and the invention is not limited to the exact details shown or described. References to "the preferred embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in the preferred embodiment" does not necessarily refer to the same embodiment, though it may.

What is claimed is:

1. A night vision system comprising:
    an eyepiece comprising:
        an optical device including a front end facing an object to be viewed through the optical device, a back end opposite the front end, a first end, and a second end opposite the first end;
        a layer of electrically switchable coating provided adjacent an exterior surface of the front end of the optical device, wherein the coating is selectively switchable via actuation of a button switch controlling electrical current to switch the coating between a transparent mode and an opaque mode, and wherein when the coating is in the transparent mode light enters the optical device through the front end, and wherein when the coating is in the opaque mode no light enters the front side of the optical device; and
    a video camera operatively linked with the eyepiece to project a video image collected externally of the eyepiece in the optical device toward an eye of a user looking through the eyepiece, wherein the video image passes through the optical device and when the electrically switchable coating is in the opaque mode no light generated from the video image exits the optical device which is adapted to reduce the likelihood of detecting the night vision system from afar based on light generated by the video image.

2. The night vision system of claim 1 wherein the eyepiece further comprises:
    a splitting surface positioned behind the electrically switchable coating and forwardly from the back end within the optical device to reflect as least some of the video image toward the eye of the user, and wherein the splitting surface allows some light of an optical image received from in front of the eyepiece forwardly from the electrically switchable coating to pass through the eyepiece to the eye of the user.

3. The night vision system of claim 2 wherein the optical device further comprises:
    two prisms with the splitting surface located between the two prisms, and the two prisms located rearwardly from the electrically switchable coating, wherein the splitting surface is oriented at an angle of about 45° relative to the electrically switchable coating.

4. The night vision system of claim 3 wherein the splitting surface is a thin layer of evaporated metallic second coating located on one of the two prisms, wherein the splitting surface receives the video image therethrough from the video camera until the video image is reflected off the second end of the optical device and then the video image reflects off the splitting surface to project some of the video image towards the eye of the user, and simultaneously wherein the splitting surface permits some of the video image from the video camera to be reflected towards the forward end of the optical device; and
    wherein the video image that is reflected towards the forward end is prevented from leaving the optical device when the electrically switchable coating is in the opaque mode.

5. The night vision system of claim 2 wherein the optical device is formed with plastic with the splitting surface inside the plastic located rearwardly from the electrically switchable coating.

6. The night vision system of claim 1 wherein the electrically switchable coating is on a front end of the optical device.

7. The night vision system of claim 1 wherein the electrically switchable coating further comprises:
an electro-chromic coating.

8. The night vision system of claim 4 wherein the evaporated metallic second coating located on one of the two prisms allows between 45 percent and 55 percent of light to pass.

9. The night vision system of claim 1 further comprising:
an organic LED (OLED) located adjacent the second end of the optical device that is between a front end of the optical device and a back end of the optical device, and wherein the OLED is configured to project the video image into the optical device.

10. The night vision system of claim 4 wherein the optical image and the video image enter the optical device at about 90 degrees with respect to each other.

11. The night vision system of claim 1 wherein the video camera is a thermal camera.

12. The night vision system of claim 1 wherein the video camera is an infra-red camera.

13. The night vision system of claim 1 further comprising:
a data network connection, wherein the video camera is configured to receive data from the network connection and project the data into the optical device, wherein when the electrically switchable coating is in the opaque mode, no light generated from the projection of the received data exits the optical device.

14. The night vision system of claim 1 further comprising one or more of the group of:
a curved surface defining the front end on the optical device between the electrically switchable coating and the eye of the user, and
a lens with a convex lens surface between the switchable material and the eye of the user.

15. The night vision system of claim 1 wherein the eyepiece is a first eyepiece and further comprising:
a second eyepiece the same as the first eyepiece, wherein the first eyepiece is adapted to be placed in front of a first eye of the user and wherein the second eyepiece is adapted to be placed in front of a second eye of the user.

16. A method comprising:
allowing optical images in front of an eyepiece to enter the eyepiece;
capturing video images with a camera and projecting them into the eyepiece through a splitting surface located rearwardly from the front of the eyepiece;
switching, via actuation of a button switch controlling electrical current, an electrically switchable coating provided on a front end of the eyepiece from a transparent mode that allows the optical images to enter the eyepiece to an opaque mode that prevents light from entering at least the front end of the eyepiece and that prevents light from exiting at least the front end of the eyepiece, wherein video images projected into eyepiece when the electrically switchable coating is in the opaque mode no light generated from the video image exits the optical device which is adapted to reduce the likelihood of detecting the night vision system from afar based on light generated by the video image.

17. The method of claim 16 further comprising:
injecting into the eyepiece when the eyepiece is in the opaque mode at least one of the group of: a global positing system (GPS) location, battlefield instructions or secret data.

18. The method of claim 16 further comprising;
mounting the video camera on a gun; and
pointing the gun around a corner to see what is around the corner before walking around the corner.

19. The night vision system of claim 9 wherein at least one of the first end and the second end of the optical device is curved and focuses the video image projected from the OLED.

20. The system of claim 1, further comprising:
a gun, wherein the video camera is mounted on the gun and adapted to enable the user to the gun around a corner to see what is around the corner before walking around the corner.

21. The system of claim 10, wherein the second end is concavely curved to reflect the video image back towards the splitting surface, after the video image has passed through the splitting surface.

* * * * *